United States Patent
Lu et al.

(10) Patent No.: US 12,211,282 B1
(45) Date of Patent: Jan. 28, 2025

(54) DYNAMIC SCENE RECONSTRUCTION USING NEURAL RADIANCE FIELD TECHNOLOGY

(71) Applicant: Toyota Motor Engineering & Manufacturing North America, Inc., Plano, TX (US)

(72) Inventors: Hongsheng Lu, San Jose, CA (US); Nejib Ammar, Sunnyvale, CA (US); Akila C. Ganlath, San Jose, CA (US); Qi Chen, San Jose, CA (US); John B. Kenney, Mountain View, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 21 days.

(21) Appl. No.: 18/225,792

(22) Filed: Jul. 25, 2023

(51) Int. Cl.
 *G06V 20/52* (2022.01)
 *G06T 7/00* (2017.01)

(52) U.S. Cl.
 CPC ............ *G06V 20/52* (2022.01); *G06T 7/0002* (2013.01); *G06T 2207/20084* (2013.01); *G06V 2201/07* (2022.01)

(58) Field of Classification Search
 CPC ..................................................... G06V 20/52
 See application file for complete search history.

(56) References Cited

U.S. PATENT DOCUMENTS

| 11,544,894 B2 | 1/2023 | Funt et al. |
| 2022/0398806 A1 | 12/2022 | Arksey et al. |

OTHER PUBLICATIONS

"Neural Radiance Field (NeRF): A Gentle Introduction", Datagen, obtained online at: https://datagen.tech/guides/synthetic-data/neural-radiance-field-nerf/, on Jul. 20, 2023, 8 pages.

*Primary Examiner* — Y Lee
(74) *Attorney, Agent, or Firm* — Christopher G. Darrow; Darrow Mustafa PC (57) ABSTRACT

Systems, methods, and other embodiments described herein relate to reconstructing a dynamic scene using Neural Radiance Field (NeRF) technology. In one embodiment, a method includes receiving, from one or more sensors, a plurality of video clips of an environment. The method includes generating a second plurality of video clips based on the plurality of video clips, and reconstructing, using NeRF technology, a scene as a continuous function based on the second plurality of video clips.

17 Claims, 4 Drawing Sheets

DYNAMIC SCENE RECONSTRUCTION USING NEURAL RADIANCE FIELD TECHNOLOGY

FIELD

The subject matter described herein relates, in general, to systems and methods for generating a dynamic 3-dimensional scene using neural radiance field (NeRF) technology.

BACKGROUND

Identifying and determining the external damage or the internal damage to a vehicle that has been involved in a collision based on observing visible damage to the vehicle after the collision may lead to an inaccurate determination of the damage and the required repair process.

SUMMARY

In one embodiment, a system for generating a dynamic 3-dimensional scene using NeRF technology is disclosed. The system includes a processor and a memory in communication with the processor. The memory stores machine-readable instructions that, when executed by the processor, cause the processor to receive, from one or more sensors, a plurality of video clips of an environment, generate a second plurality of video clips based on the plurality of video clips, and reconstruct, using the NeRF technology, a scene as a continuous function of space and time based on the second plurality of video clips.

In another embodiment, a method for generating a dynamic 3-dimensional scene using NeRF technology is disclosed. The method includes receiving, from one or more sensors, a plurality of video clips of an environment, generating a second plurality of video clips based on the plurality of video clips, and reconstructing, using NeRF technology, a scene as a continuous function of space and time based on the second plurality of video clips.

In another embodiment, a non-transitory computer-readable medium for generating a dynamic 3-dimensional scene using NeRF technology and including instructions that, when executed by a processor, cause the processor to perform one or more functions is disclosed. The instructions include instructions to receive, from one or more sensors, a plurality of video clips of an environment, generate a second plurality of video clips based on the plurality of video clips, and reconstruct, using the NeRF technology, a scene as a continuous function of space and time based on the second plurality of video clips.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with generating a dynamic 3-dimensional scene, are disclosed. More specifically, the systems, methods, and other embodiments associated with generating a dynamic 3-dimensional scene using NeRF technology are disclosed.

It can be difficult to determine the extent of the damage to a vehicle that has been involved in a collision. As an example, the process of determining the external damage or the internal damage to the vehicle may depend on human observation of the vehicle after the collision, which may lead to an incomplete, inaccurate, and/or lengthy diagnosis.

Accordingly, in one embodiment, the disclosed approach is a system that reconstructs a dynamic 3-dimensional scene of the collision using NeRF technology and determines the damage to and a repair plan for the vehicle involved in the collision using neural networks.

The system may include at least two neural networks-a neural radiance field (NeRF) and a second neural network. A NeRF is a type of neural network that can be trained to receive multiple video clips from multiple connected sources such as vehicles, drones, mobile devices, or infrastructure. These connected sources include sensors that are capable of recording and storing video clips of the surrounding environment. As an example, the connected vehicles may store up to one week's worth of video clips. The video clips may vary in length from a few minutes to several hours long. The connected sources and/or the sensors in the connected sources may include a global positioning system (GPS) or any other suitable system for determining the position and/or location of the connected sources and/or the sensors in the connected sources. The video clips may include location and/or trajectory information based on the GPS or any other suitable system. The location and/or trajectory information can indicate the location of the sensor when the sensor captures the video clip. These connected sources may be connected to a server such that the connected sources are capable of uploading video clips to the server and communicating with each other.

The NeRF can be trained to reconstruct a dynamic 3-dimensional scene from the video clips received from the connected sources. The dynamic 3-dimensional scene can be viewed from multiple angles of, as an example, a collision and the vehicles involved in the collision. In such an example, the dynamic 3-dimensional scene may show the collision and the vehicles involved in the collision from a front view, a side view, and a back view of the collision and the vehicles involved. The dynamic 3-dimensional scene is in video format and may show, as an example, the speed of the vehicles during the collision and the point of impact between the vehicles. The dynamic 3-dimensional scene is a continuous function, which means that there are no breaks in the video. In other words, the dynamic 3-dimensional scene is a continuous function of space and time.

The second neural network can be trained to analyze the dynamic 3-dimensional scene to determine what is the external damage and/or the internal damage to the vehicle. The second neural network can be further trained to generate a list of parts required to repair the external and/or internal damage. The second neural network may also be trained to develop a repair plan and estimate the cost of repair.

The system may receive a request from an interested entity such as an insurance company to reconstruct a dynamic 3-dimensional scene of a collision and determine the damage to and a repair plan for a vehicle involved in the collision. As an example, the interested entity may submit a request to the system. The request may include a still image of the collision or the vehicle, a time stamp and a location. The system may then request video clips relating to the still image, the time stamp and/or the location from connected sources using any suitable communication or transmission method. In response, the system may receive video clips from the connected sources.

The system may assess the quality of the video clips received and may discard video clips with low quality, such as low resolution or video clips where the collision and the vehicles are too far away from the capturing sensor. The system may also discard video clips with redundant information. The system may keep the remaining video clips and may then determine the position and orientation of the sensors that captured the remaining video clips in relation to each other using any suitable techniques such as the trajectory information from the GPS, visual odometry and image correspondence identification and matching. The system may then feed the remaining video clips along with the position and orientation of the sensors associated with the video clips and timestamps to the NeRF.

The NeRF may generate a dynamic 3-dimensional scene based on the remaining video clips. The system may then feed the dynamic 3-dimensional scene to the second neural network and the second neural network may determine the external and/or internal damage to the vehicle(s) based on the dynamic 3-dimensional scene. The second neural network may also determine a repair plan, a list of vehicle parts required for the repair, and a cost estimate for the repair, including cost of labor and cost of parts. The system may transmit information relating to the damage to the vehicle, the repair plan, the list of vehicle parts, and the cost estimate to any interested entity, such as the insurance company, a vehicle owner, a vehicle operator, a vehicle repair team, or a police department.

The embodiments disclosed herein present various advantages over current technologies. First, the system reduces the time taken to determine the damage to a vehicle. Second, the system more accurately determines the damage to the vehicle. Third, the system eliminates the need for a field adjuster to travel to the site of the collision as the field adjuster may make their determination based on the dynamic 3-dimensional scene. Fourth, the system assists in developing a list of vehicle parts required for repair as well as a repair plan. Fifth, the system may reduce costs such as labor costs.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
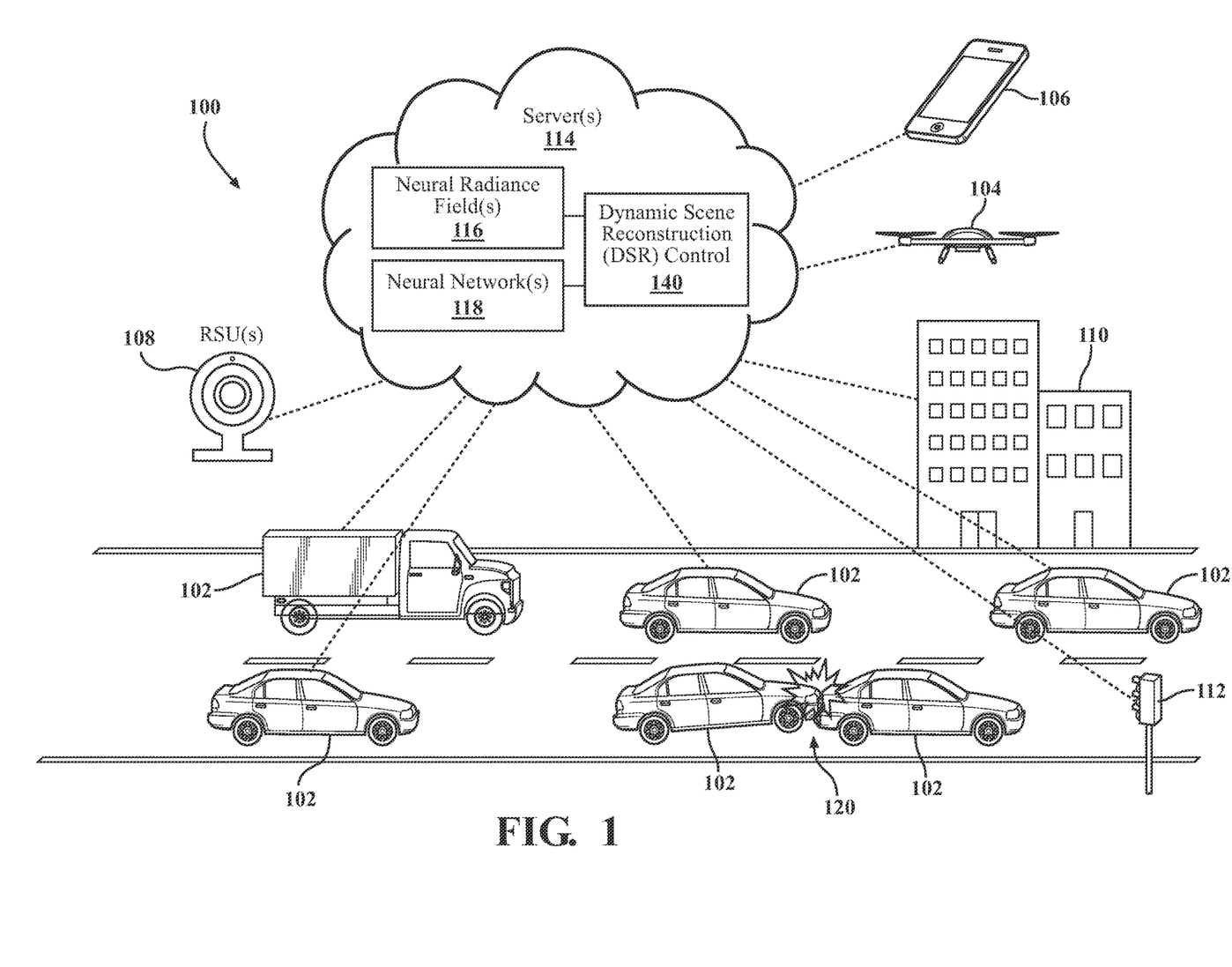
FIG. 1 is an example of a dynamic scene reconstruction (DSR) system.

Referring to FIG. 1, an example of a dynamic scene reconstruction (DSR) system 100 is shown. The DSR system 100 may include various elements, which may be communicatively linked in any suitable form. As an example, the elements may be connected, as shown in FIG. 1. Some of the possible elements of the DSR system 100 are shown in FIG. 1 and will now be described. It will be understood that it is not necessary for the DSR system 100 to have all the elements shown in FIG. 1 or described herein. The DSR system 100 may have any combination of the various elements shown in FIG. 1. Further, the DSR system 100 may have additional elements to those shown in FIG. 1. In some arrangements, the DSR system 100 may not include one or more of the elements shown in FIG. 1. Further, it will be understood that one or more of these elements may be physically separated by large distances.

The elements of the DSR system 100 may be communicatively linked through one or more communication networks. As used herein, the term "communicatively linked" can include direct or indirect connections through a communication channel or pathway or another component or system. A "communication network" means one or more components designed to transmit and/or receive information from one source to another. The one or more of the elements of the DSR system 100 may include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network can further be implemented as or include one or more wireless networks, whether short-range (e.g., a local wireless network built using a Bluetooth or one of the IEEE 802 wireless communication protocols, e.g., 802.11a/b/g/i. 802.15, 802.16, 802.20, Wi-Fi Protected Access (WPA), or WPA2) or long-range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The DSR system 100 can include one or more sensors. The sensors may be mobile sensors and/or stationary sensors. As an example, mobile sensors may be sensors in vehicles 102, drones 104, and/or mobile devices 106 such as mobile phones. As such, the DSR system 100 may include vehicle sensors. The vehicle 102 is a connected vehicle that is communicatively linked to one or more elements of the DSR system 100. Similarly, the drone 104 and the mobile device 106 are communicatively linked to one or more elements of the DSR system 100. As another example, stationary sensors may be sensors in roadside units (RSUs) 108 and/or other roadside infrastructure such as buildings 110 or traffic control lights 112. The roadside units 108 and the other roadside infrastructure 110, 112 are communicatively linked to one or more elements of the DSR system 100. The sensors may include any suitable positioning system for determining the position and/or location of the sensors.

As such, the DSR system 100 may include connected vehicles 102, drones 104, mobile devices 106, RSUs 108, and/or roadside infrastructure 110, 112. As used herein, "vehicle" means any form of motorized transport. In one or more implementations, the vehicle 102 can be an automobile. While arrangements will be described herein with respect to automobiles, it will be understood that embodiments are not limited to automobiles. In some implementations, the vehicle 102 may be any device that, for example, transports passengers and includes the noted sensory devices from which the disclosed predictions and determinations may be generated. The vehicle 102 can be any other type of vehicle that may be used on a roadway, such as a motorcycle. In some implementations, the vehicle 102 can be a watercraft, an aircraft, or any other form of motorized transport.

The DSR system 100 can include one or more servers 114. The server(s) 114 may be, for example, cloud-based server(s) or edge-based server(s). The server(s) 114 may communicate with one or more vehicles 102 over a communication module, such as by any type of vehicle-to-cloud (V2C) communications, now known or later developed. More generally, the server(s) 112 may communicate with the vehicles 102, the drones 104, the mobile devices 106, the RSUs 108, and/or the other roadside infrastructure 110, 112 using any suitable means of communication.

The DSR system 100 can include one or more neural networks, such as a neural radiance field (NeRF) 116 and a second neural network 118. The DSR system 100 may include a NeRF 116 that is capable of generating 3-dimensional dynamic scenes from 2-dimensional video clips. A dynamic scene is a video of a scene based on motion and time. A 3-dimensional scene is a scene that is visible on the x-axis, the y-axis, and the z-axis. As such and as an example, the NeRF 116 may output motion videos that can be viewed from various angles. The NeRF 116 may receive multiple 2-dimensional video clips showing an environment from different angles and may then interpolate between the multiple 2-dimensional video clips to render a dynamic 3-dimensional scene.

The DSR system 100 may include another neural network, a second neural network 118 that is capable of determining exterior damage to a vehicle 102 involved in a collision 120 based on the dynamic 3-dimensional scene. The second neural network 118 may determine the exterior damage to the vehicle 102 based on the speed of travel of the vehicle 102 and other objects that are in contact with the vehicle 102. The second neural network 118 may further determine the exterior damage to the vehicle 102 based on the force of impact as perceived from the dynamic 3-dimensional scene. Other factors may include the size of vehicle 102 and other objects involved in the collision, and the angle at which the other object(s) made contact with the vehicle 102. The second neural network 118 may be trained to determine exterior damage to a vehicle using any suitable methods and any training data.

The DSR system 100 may include a third neural network 118 that is capable of determining internal damage to a vehicle 102 involved in a collision 120 based on the dynamic 3-dimensional scene. The third neural network 118 may determine the internal damage to the vehicle 102 based on the speed of travel of the vehicle 102 and other objects that are in contact with the vehicle 102. The third neural network 118 may further determine the internal damage to the vehicle 102 based on the force of impact as perceived from the dynamic 3-dimensional scene. Other factors may include the size of vehicle 102 and other objects involved in the collision 120, and the angle at which contact was made with the vehicle 102. The third neural network 118 may be trained to determine internal damage to a vehicle 102 using any suitable methods and any suitable training data. Alternatively, the second neural network 118 may be capable of determining external and internal damage to a vehicle 102.

The DSR system 100 may include a dynamic scene reconstruction (DSR) control 140 that is described in detail below.

Figure 2:
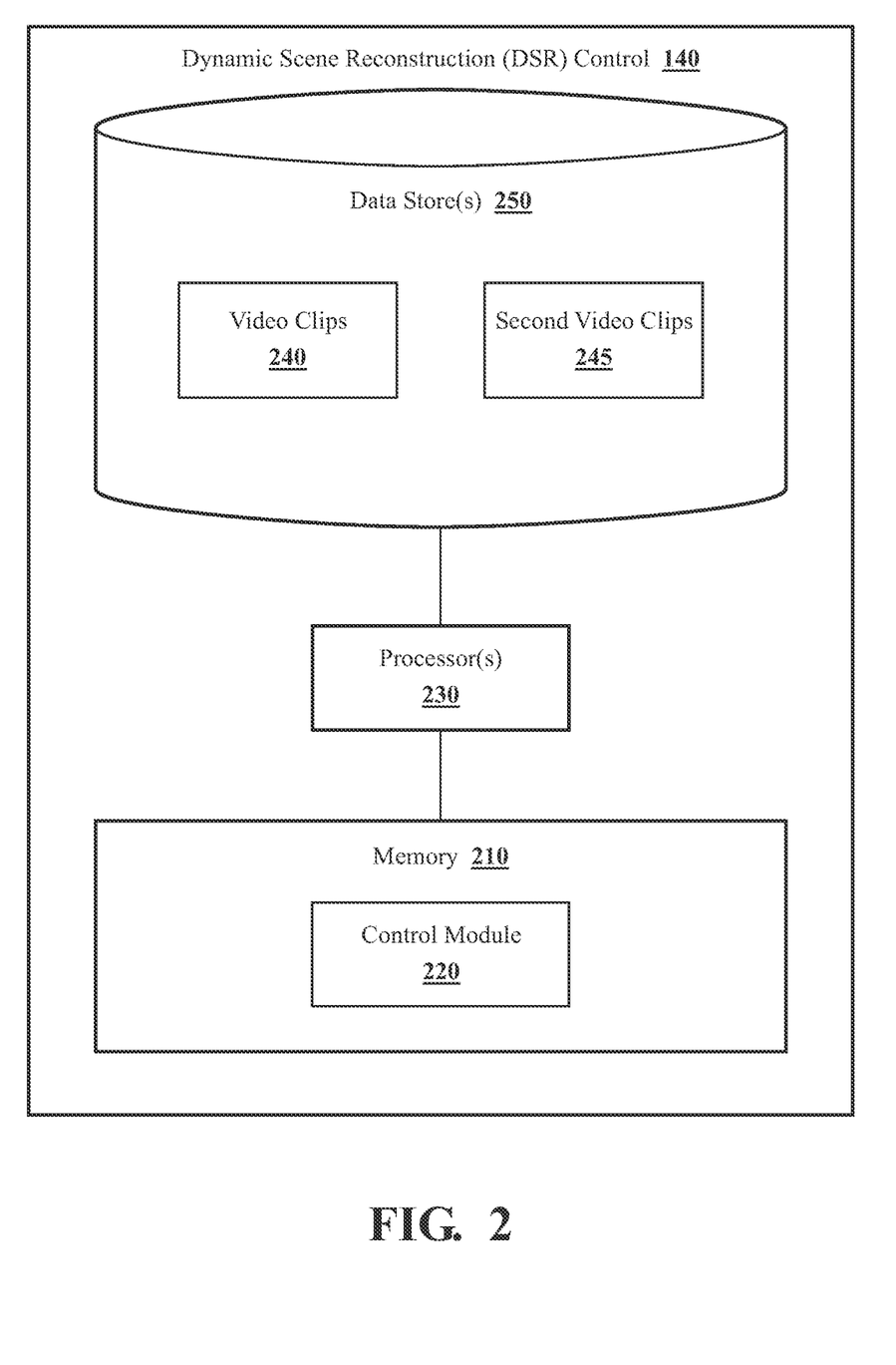
FIG. 2 is an embodiment of the DSR system of FIG. 1.

With reference to FIG. 2, an embodiment of the DSR control 140 of FIG. 1 is further illustrated. The DSR control 100 is shown as including a processor 230. The DSR control 140 may access the processor 230 through a data bus or another communication path. In further aspects, the processor 230 is a cloud-based resource that communicates with the DSR control 140 through a communication network. In one embodiment, the DSR control 140 includes a memory 210 that stores a control module 220. The memory 210 is a random-access memory (RAM), read-only memory (ROM), a hard-disk drive, a flash memory, or other suitable memory for storing the control module 220. The control module 220 includes, for example, computer-readable instructions within the physical memory 210 that when executed by the processor 230 cause the processor 230 to perform the various functions disclosed herein.

In one embodiment, the DSR control 140 includes a data store 250. The data store 250 is, in one embodiment, an electronic data structure (e.g., a database) stored in the memory 210 or another data store and that is configured with routines that may be executed by the processor 230 for analyzing stored data, providing stored data, organizing stored data, and so on. Thus, in one embodiment, the data store 250 stores data used by the control module 220 in executing various functions. In one embodiment, the data store 250 includes video clips 240 along with other information that is used by the control module 220.

The video clips 240 may originate from one or more sources. As an example and as previously mentioned, the video clips 240 may originate from the mobile sensors, such as the sensors in vehicles 102, drones 104, and/or mobile devices 106, and/or the stationary sensors such as sensors in RSUs 108 and/or infrastructure such as buildings 110 and traffic control lights 112. The sources 102, 104, 106, 108, 110, 112 may include any entities capable of wireless communication. Additionally, the video clips 240 may originate from sensors of vehicles 102 and/or objects involved in the collision 120.

The video clips 240 are video recordings of an environment and objects such as vehicles 102, pedestrians, infrastructure 110, 112, and/or vegetation in the environment.

In one embodiment, the control module 220 includes instructions that function to control the processor 230 to receive, from one or more sensors, video clips 240 of an environment, generate a second plurality of video clips 245 based on the plurality of video clips 240, and reconstruct, using Neural Radiance Field (NeRF) technology, a scene as a continuous function based on the second plurality of video clips 245.

The control module 220 may receive, from multiple sensors, video clips 240 of the environment. As an example, in the event of a collision 120, an entity such as a police officer, a passer-by, or an operator of a vehicle 102 involved in the collision 120 may upload a still image and/or a video clip of the environment where the collision 120 occurred to a database or server 114. The entity may further submit a request for a reconstruction of the scene involving the collision 120 and the surrounding environment. The request may further include a date, a time, and/or a location of the collision 120. The control module 220 may receive a notification when the request is submitted. In response to the notification, the control module 220 may output a request to connected entities such as vehicles 102, drones 104, mobile devices 106, and/or infrastructure 108, 110, 112 to upload video clips that match the date, the time, the location, objects in the still image, and/or objects in the video clip of the collision. In response to the request from the control module 220, the connected entities may upload related video clips to a database and/or a server accessible by the control module. The connected entities, particularly the mobile entities such as the vehicles 102, the drones 104, and the mobile devices 106, may have travelled past the collision 120 but may no longer be in the vicinity of the collision 120.

The control module 220 may generate a second plurality of video clips 245 based on the plurality of uploaded video clips 240. As an example, the control module 220 may identify one or more video clips of low quality within the uploaded video clips 240 and generate the second plurality of video clips 245 based on the uploaded video clips 240 less than the video clips of low quality. In such an example, the control module 220 may access the uploaded video clips 240 and determine whether the uploaded video clips 240 meet a predetermined quality threshold. The quality may be based on the resolution of the video clips 240 or the distance between the objects in the video clips 240 and the sensor capturing the video clips 240. The control module 220 may keep the uploaded video clips 240 that meet or exceed the predetermined quality threshold and discard or delete the uploaded video clips 240 that do not meet the predetermined quality threshold. The control module 220 may store the video clips 240 that meet or exceed the predetermined quality threshold in a second plurality of video clips (also known as second video clips) 245.

As another example, the control module 220 may identify one or more objects of interest within the video clips 240 and generate the second video clips 245 based on the video clips 240 including the objects of interest. An object of interest may be an object that is of interest to the entity submitting the request. In such an example, the control module 220 may identify objects in the still image and/or a video clip that was originally submitted. As an example, the control module 220 may identify a red vehicle in the still image and/or video clip that was originally submitted and may tag the red vehicle as an object of interest. The control module 220 may also receive the object(s) of interest as part of the submission process. In other words, the entity submitting the request may indicate the object(s) of interest in the still image and/or video clip. The control module 220 may then monitor or analyze the uploaded video clips 240 to determine whether the object(s) of interest are present in the uploaded video clips 240. The control module 220 may use any suitable method to monitor, analyze, compare, and/or detect the object(s) of interest in the uploaded video clips 240. Upon identifying the uploaded video clips 240 that include the object(s) of interest, the control module 220 may keep the video clips that include the object(s) of interest and discard the uploaded video clips that do not include the object(s) of interest. The control module 220 may store the video clips that include the object(s) of interest in the second video clips 245.

As another example, the control module 220 may identify one or more objects of interest within the plurality of video clips 240, identify one or more video clips within the plurality of video clips 240 in which the one or more objects of interest are occluded, and generate the second plurality of video clips based on the video clips 240 less the one or more video clips within the video clips 240 in which the one or more objects of interest are occluded. In such an example, the control module 220 may identify object(s) of interest within the video clips 240 as disclosed above. The control module 220 may then determine whether a portion of the object(s) of interest is occluded and may further determine whether the portion that is occluded is over a predetermined threshold value. The control module 220 may then discard the video clips where the portion of the object(s) of interest that is occluded meets or exceeds the predetermined threshold value. The control module 220 may then keep the remaining video clips and store the remaining video clips in the second video clips 245.

The control module 220 may arrange the second video clips 245 based on the positions and orientation of the capturing sensors using any suitable techniques. As an example, the control module 220 may perform a coarse alignment of the second video clips 245 based on the positioning of the sensors associated with the second video clips 245 according to the global positioning system (GPS). Then the control module 220 may perform a refined alignment of the position of the second video clips 245 and the associated sensors using visual odometry, which is the process of determining the position and orientation of a sensor by analyzing the associated video clips. The control module 220 may then determine the relative positions between each pair of sensors using an image correspondence process. The control module 220 may also determine the relative positions of the sensors as a function of time.

The control module 220 may reconstruct, using Neural Radiance Field (NeRF) technology, a scene as a continuous function based on the second video clips 245. The scene is a dynamic 3-dimensional scene which is a reconstructed video recording of the scene. A scene as a continuous function refers to a video of the scene that does not include any breaks as a function of time. In other words, a segment of the resulting video has a relationship with the preceding and succeeding segments. More generally, space-adjacent segments in the resulting video have a relationship, and time-adjacent segments in the resulting video have a relationship. Space adjacent segments are segments that are beside each other in space and time-adjacent segments are segments that precede or succeed each other in time.

As an example, the control module 220 may feed the second video clips 245 that have been arranged based on the positions and orientation of the capturing sensors into the NeRF. The NeRF, as previously disclosed, is capable of reconstructing a scene as a continuous function based on video clips. The scene may include a collision 120 involving a vehicle 102. In such a case, the control module 220 may determine, using a neural network 118, damage to the vehicle 102 based on the scene. The damage may be external damage to the vehicle 102 and/or internal damage to the vehicle 102. External damage is damage that is observable from outside the vehicle 102. An example of external damage to the vehicle 102 includes damage to the exterior portions of the vehicle 102 such as the hood, the doors, the roof, or the trunk of the vehicle 102. Internal damage is damage to the vehicle 102 that is not observable from outside the vehicle 102. An example of internal damage to the vehicle 102 includes damage to the engine, the gas tank, electronic components, or the instrument panel of the vehicle 102.

As previously mentioned, the neural network 118 may be trained to determine external damage and/or internal damage to the vehicle 102 based on events shown in the dynamic scene. As such, the control module 220 may feed the dynamic 3-dimensional scene to the neural network 118. The neural network 118 may utilize any suitable methods such as machine learning techniques and/or artificial intelligence technology to determine the external damage and/or the internal damage to the vehicle 102 based on the events identified in the dynamic 3-dimensional scene. The neural network 118 may determine the damage based on factors such as the speed of travel of the vehicle(s) 102 and/or objects involved in the collision 120, the size of the vehicle(s) 102 and/or objects, the angle and point of impact between the vehicle(s) 102 and/or objects.

Upon determining the damage, the control module 220 may then further determine a course of action, which may include a vehicle repair plan, a list of parts required for vehicle repair, cost of materials, cost of labor, and/or vehicle repair completion time. The control module 220 may make the determinations using the neural network and any suitable machine learning or artificial intelligence techniques. The control module 220 may share or transmit the course of action to any interested entities such as a user, operator, a customer, an insurance company, a vehicle repair team, and/or a vehicle parts procurement team.

Figure 3:
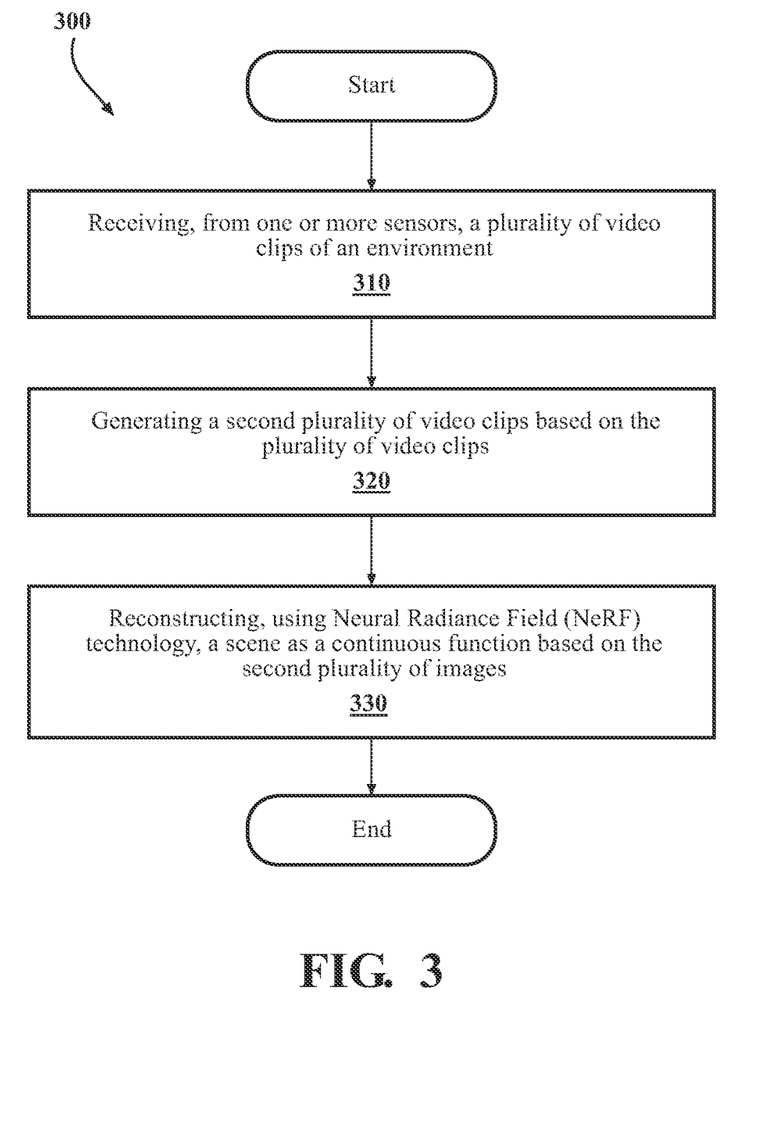
FIG. 3 is a flowchart illustrating one embodiment of a method associated with generating a dynamic 3-dimensional scene.

FIG. 3 is a flowchart illustrating one embodiment of a method associated with generating a dynamic 3-dimensional scene. The method 300 will be described from the viewpoint of the DSR system 100 of FIG. 1 and the DSR control 140 of FIGS. 1 and 2. However, the method 300 may be adapted to be executed in any one of several different situations and not necessarily by the DSR system 100 of FIG. 1 or the DSR control 140 of FIGS. 1 and 2.

At step 310, the DSR system 100 may cause the processor(s) 230 to receive, from one or more sensors, a plurality of video clips 240 of an environment. As previously mentioned, in response to a request from an entity such as a police officer, the control module 220 may receive a still image or a video clip from the entity and then request video clips related to the still image or video clip from any connected sources such as connected vehicles 102, drones 104, mobile devices 106, or infrastructure 108, 110, 112. The connected sources 102, 104, 106, 108, 110, 112 may transmit to the control module 220 video clips that match the time, location, and/or the objects in the still image or video clip. In response, the control module 220 may receive the video clips 240 from the connected sources 102, 104, 106, 108, 110, 112.

At step 320, the DSR system may cause the processor(s) 230 to generate a second plurality of video clips 245 based on the plurality of video clips 240. As previously mentioned, the control module 220 may identify video clips of poor quality and discard the video clips of poor quality while keeping the video clips 245 that meet or exceed a video quality threshold as the second video clips 245. As another example and as previously mentioned, the control module 220 may identify an object of interest in the video clips 240 and may discard video clips that do not include the object of interest or video clips in which the object of interest is occluded. The control module 220 may keep the remaining video clips as the second video clips 245.

At step 330, the DSR system 100 may cause the processor(s) 230 to reconstruct, using Neural Radiance Field (NeRF) technology, a scene as a continuous function based on the second video clips 245. As previously mentioned, the control module 220 may feed the second video clips 245 to the NeRF 116, which would generate a dynamic 3-dimensional scene of the related environment. The control module 220 may feed the dynamic 3-dimensional scene to the neural network 118 that is trained and capable of determining the external damage and/or internal damage to a vehicle 102 based on the dynamic 3-dimensional scene.

Figure 4:
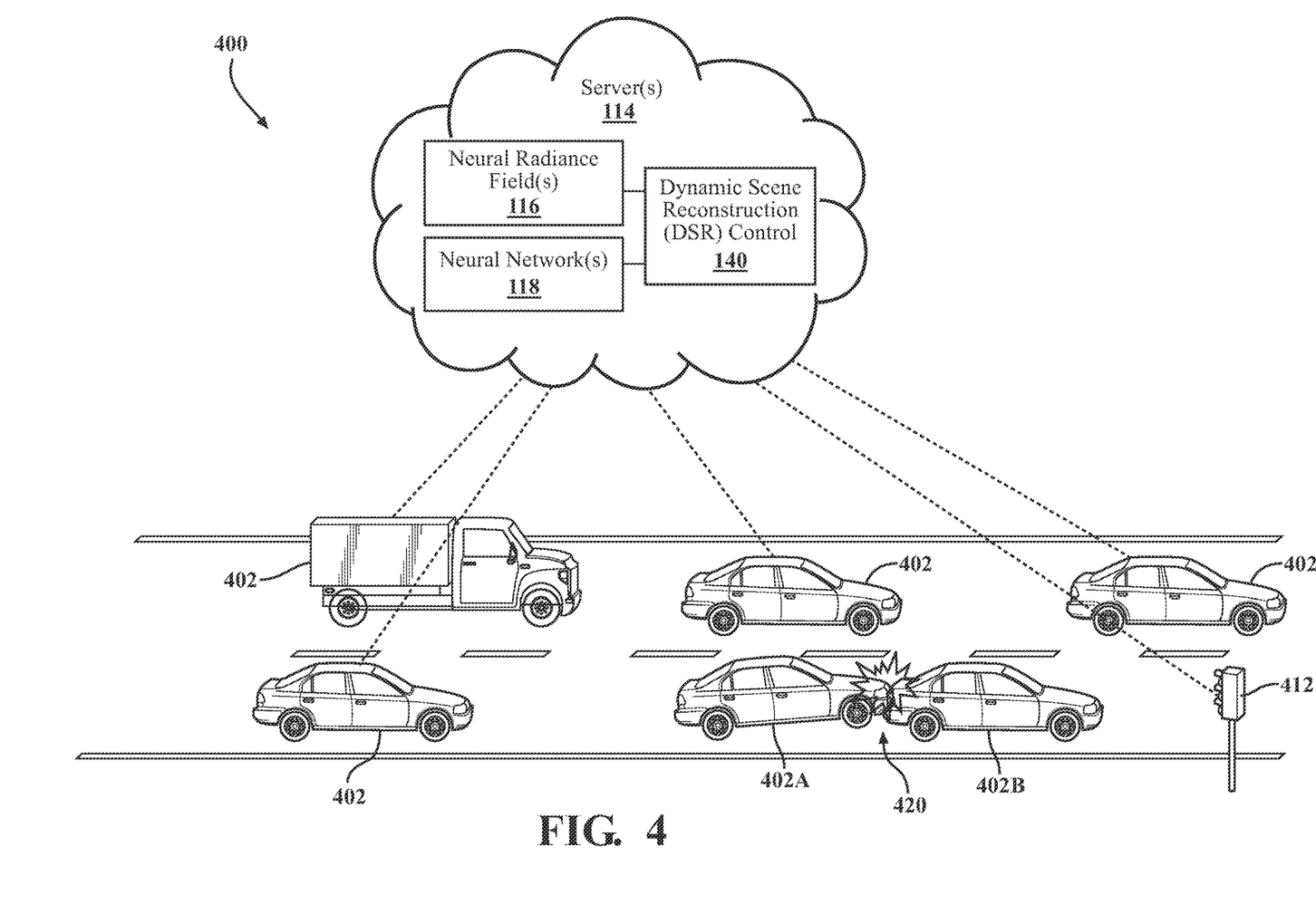
FIG. 4 is an example of a dynamic 3-dimensional scene reconstruction scenario.

A non-limiting example of the operation of the DSR system 100 and/or one or more of the methods will now be described in relation to FIG. 4. FIG. 4 shows an example of a dynamic 3-dimension scene reconstruction scenario.

In FIG. 4, two vehicles 402A, 402B are involved in a collision 420 near a traffic control light 412. Passing vehicles 402 are travelling past the collision. The passing vehicles 402 are connected to the server 114.

As an example, the operator of one of the vehicles 402A involved in the collision 420 uploads a still image of the collision 420 to the server 114. In addition to uploading the still image, the operator submits additional information such as the time and location of the collision 420.

In response to the submission of the still image and the additional information, the DSR system 400, or more specifically, the control module 220 requests and receives video clips 240 from connected sources such as the passing vehicles 402 and the traffic control light 412.

The DSR system 400, or more specifically, the control module 220 generates a second plurality of video clips 245 based on the received video clips. The DSR system 400, or more specifically, the control module 220 discards video clips that do not meet a video quality threshold and sends the remaining video clips (also known as the second video clips) 245 to the NeRF 116. The NeRF 116 generates a dynamic 3-dimensional scene based on second video clips 245 that meet or exceed the video quality threshold.

The DSR system 400, or more specifically the control module 220, then determines, using the neural network 118, damage to the vehicles 402A, 402B involved in the collision 420. In this example, the neural network 118 determines the external damage and internal damage to the vehicles 402A, 402B. The neural network 118 then determines a course of action such as a vehicle repair plan, a list of vehicle parts required for the repair, and the estimated cost of the repair including cost for vehicle parts and cost for labor. The control module 220 then transmits the course of action to the operator that made the request, a server, and any other interested entities.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method comprising:
receiving, from one or more sensors, a plurality of video clips of an environment;
generating a second plurality of video clips based on the plurality of video clips;
reconstructing, using Neural Radiance Field (NeRF) technology, a scene as a continuous function based on the second plurality of video clips, the scene includes a collision of a vehicle; and
determining, using a neural network, damage to the vehicle based on the scene.

2. The method of claim 1, wherein generating the second plurality of video clips includes:
identifying one or more video clips of low quality within the plurality of video clips; and
generating the second plurality of video clips based on the plurality of video clips less the one or more video clips of low quality.

3. The method of claim 1, wherein generating the second plurality of video clips includes:
identifying one or more objects of interest within the plurality of video clips; and
generating the second plurality of video clips based on the plurality of video clips including the one or more objects of interest.

4. The method of claim 1, wherein generating the second plurality of video clips includes:
identifying one or more objects of interest within the plurality of video clips;
identifying one or more video clips within the plurality of video clips in which the one or more objects of interest are occluded; and generating the second plurality of video clips based on the plurality of video clips less the one or more video clips within the plurality of video clips in which the one or more objects of interest are occluded.

5. The method of claim 1, wherein the one or more sensors include at least one of:
   a vehicle sensor:
   a mobile sensor; and
   a stationary sensor.

6. The method of claim 1, wherein the scene as a continuous function refers to a video of the scene that does not include any breaks as a function of time.

7. A system comprising:
   a processor; and
   a memory storing machine-readable instructions that, when executed by the processor, cause the processor to:
      receive, from one or more sensors, a plurality of video clips of an environment;
      generate a second plurality of video clips based on the plurality of video clips;
      reconstruct, using Neural Radiance Field (NeRF) technology, a scene as a continuous function based on the second plurality of video clips, the scene includes a collision of a vehicle; and
      determine, using a neural network, damage to the vehicle based on the scene.

8. The system of claim 7, wherein the machine-readable instructions further include instructions that when executed by the processor cause the processor to:
   identify one or more video clips of low quality within the plurality of video clips; and
   generate the second plurality of video clips based on the plurality of video clips less the one or more video clips of low quality.

9. The system of claim 7, wherein the machine-readable instructions further include instructions that when executed by the processor cause the processor to:
   identify one or more objects of interest within the plurality of video clips; and
   generate the second plurality of video clips based on the plurality of video clips including the one or more objects of interest.

10. The system of claim 7, wherein the machine-readable instructions further include instructions that when executed by the processor cause the processor to:
    identify one or more objects of interest within the plurality of video clips;
    identify one or more video clips within the plurality of video clips in which the one or more objects of interest are occluded; and
    generate the second plurality of video clips based on the plurality of video clips less the one or more video clips within the plurality of video clips in which the one or more objects of interest are occluded.

11. The system of claim 7, wherein the one or more sensors include at least one of:
    a vehicle sensor:
    a mobile sensor; and
    a stationary sensor.

12. The system of claim 7, wherein the scene as a continuous function refers to a video of the scene that does not include any breaks as a function of time.

13. A non-transitory computer-readable medium including instructions that when executed by a processor cause the processor to:
    receive, from one or more sensors, a plurality of video clips of an environment;
    generate a second plurality of video clips based on the plurality of video clips;
    reconstruct, using Neural Radiance Field (NeRF) technology, a scene as a continuous function based on the second plurality of video clips, the scene includes a collision of a vehicle; and
    determine, using a neural network, damage to the vehicle based on the scene.

14. The non-transitory computer-readable medium of claim 13, wherein the instructions further include instructions that when executed by the processor cause the processor to:
    identify one or more video clips of low quality within the plurality of video clips; and
    generate the second plurality of video clips based on the plurality of video clips less the one or more video clips of low quality.

15. The non-transitory computer-readable medium of claim 13, wherein the instructions further include instructions that when executed by the processor cause the processor to:
    identify one or more objects of interest within the plurality of video clips; and
    generate the second plurality of video clips based on the plurality of video clips including the one or more objects of interest.

16. The non-transitory computer-readable medium of claim 13, wherein the instructions further include instructions that when executed by the processor cause the processor to:
    identify one or more objects of interest within the plurality of video clips;
    identify one or more video clips within the plurality of video clips in which the one or more objects of interest are occluded; and
    generate the second plurality of video clips based on the plurality of video clips less the one or more video clips within the plurality of video clips in which the one or more objects of interest are occluded.

17. The non-transitory computer-readable medium of claim 13, wherein the one or more sensors include at least one of:
    a vehicle sensor:
    a mobile sensor; and
    a stationary sensor.

* * * * *